(12) United States Patent
Iwasa et al.

(10) Patent No.: US 11,059,522 B2
(45) Date of Patent: Jul. 13, 2021

(54) VEHICLE BATTERY MOUNTING STRUCTURE

(75) Inventors: Makoto Iwasa, Chigasaki (JP); Hidetoshi Kadota, Yamato (JP); Tadayoshi Hashimura, Machida (JP); Shinya Ogata, Ebina (JP); Satoshi Shigematsu, Yokohama (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 1058 days.

(21) Appl. No.: 13/202,469

(22) PCT Filed: Feb. 16, 2010

(86) PCT No.: PCT/JP2010/052582
§ 371 (c)(1),
(2), (4) Date: Aug. 19, 2011

(87) PCT Pub. No.: WO2010/098270
PCT Pub. Date: Sep. 2, 2010

(65) Prior Publication Data
US 2011/0300426 A1     Dec. 8, 2011

(30) Foreign Application Priority Data

Feb. 24, 2009  (JP) .............................. JP2009-041225
Jul. 15, 2009  (JP) .............................. JP2009-166942

(51) Int. Cl.
*B62D 25/20*     (2006.01)
*B60K 1/04*      (2019.01)
(Continued)

(52) U.S. Cl.
CPC ................ *B62D 25/20* (2013.01); *B60K 1/04* (2013.01); *B60L 50/16* (2019.02); *B60L 50/51* (2019.02);
(Continued)

(58) Field of Classification Search
CPC .......... H01M 2/1083; H01M 2220/20; H01M 50/249; B60K 2001/0405–0438
(Continued)

(56) References Cited

U.S. PATENT DOCUMENTS 4,365,681 A    12/1982  Singh
5,378,555 A *   1/1995  Waters et al. .................... 429/97
(Continued)

FOREIGN PATENT DOCUMENTS

CN    1703333 A    11/2005
CN    1742396 A     3/2006
(Continued)

OTHER PUBLICATIONS

M. Iwasa et al., U.S. Notice of Allowance; U.S. Appl. No. 13/202,472, dated Jun. 21, 2013, (12 pages).
(Continued)

*Primary Examiner* — Barbara L Gilliam
*Assistant Examiner* — Helen M McDermott
(74) *Attorney, Agent, or Firm* — Foley & Lardner LLP

(57) ABSTRACT

A vehicle (1) comprises a passenger compartment (2) in which a front seat (32F), a rear seat (32R), and a floor (33) between the front seat (32F) and the rear seat (38R) are provided. A first group (S1) of batteries (3) is mounted under the front seat (32F), a second group (S2) of the batteries (3) is mounted under the floor (33), and a third group (S3) of the batteries (3) is mounted under a rear seat (32R). By setting a height (h2) of the second group (S2) of the batteries (3) to be lower than respective heights (h1, h3) of the first and third groups (S1, S3) of the batteries (3), a battery mounting capacity of the vehicle (1) can be increased without affecting the comfort of the passenger compartment (2).

13 Claims, 11 Drawing Sheets

(51) Int. Cl.

| | |
|---|---|
| B60L 50/60 | (2019.01) |
| B60L 50/64 | (2019.01) |
| B60L 58/21 | (2019.01) |
| H01M 10/04 | (2006.01) |
| H01M 50/249 | (2021.01) |
| H01M 50/209 | (2021.01) |
| H01M 50/244 | (2021.01) |
| H01M 50/291 | (2021.01) |
| H01M 50/298 | (2021.01) |
| B60L 50/51 | (2019.01) |
| B60L 58/40 | (2019.01) |
| B60L 50/71 | (2019.01) |
| B60L 50/16 | (2019.01) |
| B60L 50/72 | (2019.01) |
| B60L 58/26 | (2019.01) |
| B60L 53/80 | (2019.01) |

(52) U.S. Cl.
CPC .............. *B60L 50/64* (2019.02); *B60L 50/66* (2019.02); *B60L 50/71* (2019.02); *B60L 50/72* (2019.02); *B60L 53/80* (2019.02); *B60L 58/21* (2019.02); *B60L 58/26* (2019.02); *B60L 58/40* (2019.02); *B62D 25/2036* (2013.01); *H01M 10/0413* (2013.01); *H01M 50/209* (2021.01); *H01M 50/244* (2021.01); *H01M 50/249* (2021.01); *H01M 50/291* (2021.01); *H01M 50/298* (2021.01); *B60K 2001/0422* (2013.01); *B60K 2001/0433* (2013.01); *B60K 2001/0438* (2013.01); *B60L 2210/30* (2013.01); *B60L 2210/40* (2013.01); *B60L 2240/26* (2013.01); *H01M 2220/20* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/40* (2013.01)

(58) Field of Classification Search
USPC ........................................................ 180/68.5
See application file for complete search history.

(56) References Cited

U.S. PATENT DOCUMENTS

| | | | |
|---|---|---|---|
| 5,501,289 A | 3/1996 | Nishikawa et al. | |
| 5,534,364 A | 7/1996 | Watanabe et al. | |
| 5,601,942 A | 2/1997 | Fedele | |
| 6,085,854 A * | 7/2000 | Nishikawa | 180/68.5 |
| 6,188,574 B1 | 2/2001 | Anazawa | |
| 6,632,560 B1 | 10/2003 | Zhou et al. | |
| 6,986,969 B2 | 1/2006 | Anglin et al. | |
| 7,052,799 B2 | 5/2006 | Zatezalo et al. | |
| 7,094,495 B2 | 8/2006 | Anglin et al. | |
| 7,136,766 B2 | 11/2006 | Yasuda | |
| 7,140,745 B2 | 11/2006 | Yuen | |
| 7,424,926 B2 | 9/2008 | Tsuchiya | |
| 7,610,978 B2 | 11/2009 | Takasaki et al. | |
| 7,654,352 B2 | 2/2010 | Takasaki et al. | |
| 7,931,105 B2 | 4/2011 | Sato et al. | |
| 2002/0102447 A1 | 8/2002 | Kato | |
| 2003/0003351 A1 | 1/2003 | Ogata et al. | |
| 2003/0066694 A1* | 4/2003 | Mita | B60K 1/00 180/65.1 |
| 2003/0209375 A1* | 11/2003 | Suzuki et al. | 180/65.3 |
| 2004/0062955 A1 | 4/2004 | Kubota et al. | |
| 2004/0134699 A1 | 7/2004 | Shimizu | |
| 2006/0237248 A1 | 10/2006 | Hayashi | |
| 2006/0272877 A1 | 12/2006 | Nozaki et al. | |
| 2007/0007060 A1 | 1/2007 | Ono et al. | |
| 2007/0009787 A1* | 1/2007 | Straubel | H01M 2/105 429/99 |
| 2008/0160394 A1 | 7/2008 | Takasaki et al. | |
| 2008/0248377 A1* | 10/2008 | Hashida | H01M 2/1016 429/99 |
| 2009/0152034 A1 | 6/2009 | Takasaki et al. | |
| 2009/0167077 A1 | 7/2009 | Tsuchiya et al. | |

FOREIGN PATENT DOCUMENTS

| | | |
|---|---|---|
| CN | 1881654 A | 12/2006 |
| CN | 1885591 A | 12/2006 |
| CN | 200977849 Y | 11/2007 |
| CN | 101209661 A | 7/2008 |
| EP | 1 939 028 A1 | 7/2008 |
| JP | 6-219336 A | 8/1994 |
| JP | 7-14564 A | 1/1995 |
| JP | 7-156826 A | 6/1995 |
| JP | 9-104239 A | 4/1997 |
| JP | 2000-38035 A | 2/2000 |
| JP | 3199296 B2 | 6/2001 |
| JP | 2004-9986 A | 1/2004 |
| JP | 2004-179053 A | 6/2004 |
| JP | 2004-196217 A | 7/2004 |
| JP | 2006-182295 A | 7/2006 |
| JP | 2006-240502 A | 9/2006 |
| JP | 2007-254262 A | 10/2007 |
| JP | 2007-280806 A | 10/2007 |
| JP | 2007-314989 A | 12/2007 |
| JP | 2007-323729 A | 12/2007 |
| JP | 2007-331669 A | 12/2007 |
| JP | 2008-34745 A | 2/2008 |
| JP | 2008-162497 A | 7/2008 |
| JP | 2008-183947 A | 8/2008 |
| JP | 2008-260382 A | 10/2008 |
| JP | 2009-83600 A | 4/2009 |
| JP | 2009-83601 A | 4/2009 |
| JP | 2009-087774 A | 4/2009 |
| JP | 2009-137408 A | 6/2009 |
| JP | 2009-193942 A | 8/2009 |
| JP | 4306783 B2 | 8/2009 |
| JP | 4386131 B2 | 12/2009 |
| KR | 2003-88941 A | 11/2003 |
| KR | 10-2005-0100436 | 10/2005 |
| RU | 21 13366 C1 | 6/1998 |
| RU | 2192356 C2 | 11/2002 |
| RU | 2 260 538 C2 | 9/2005 |
| WO | WO 98/12763 A1 | 3/1998 |
| WO | WO 2004/030968 A1 | 4/2004 |
| WO | WO 2007/145304 A1 | 12/2007 |
| WO | WO 2008-125946 A1 | 10/2008 |

OTHER PUBLICATIONS

Surface Vehicle Information Report, *SAE the Engineering Society for Advancing Mobility Land Sea Air and Space International*, SAE, J2344, Issued Jun. 1998, 11 pages.
M. Iwasa et al., U.S. Final Office Action, U.S. Appl. No. 13/202,472, dated Mar. 4, 2013, (7 pgs.).
Chinese Office Action dated Sep. 16, 2013, (8 pages).
Japanese Office Action dated Sep. 17, 2013, (3 pages).
Russian Office Action and English Language Translation dated Nov. 9, 2012 (8 pages).
U.S. Appl. No. 13/202,516, filed Aug. 19, 2011, Iwasa et al.
U.S. Appl. No. 13/202,472, filed Aug. 19, 2011, Iwasa et al.
Supplementary European Search Report dated May 6, 2014, (5 pgs.).
M. Iwasa et al., USPTO Office Action; U.S. Appl. No. 13/202,516, dated May 7, 2014, (31 pgs.).
English language translation of JP 2004-179053, (19 pgs.).
M. Iwasa et al., U.S. Non-Final Office Action, U.S. Appl. No. 13/202,472, dated Aug. 15, 2012, (13 pgs.).
M. Iwasa et al., U.S. Non-Final Office Action, U.S. Appl. No. 13/202,516, dated Jan. 2, 2015, (18 pgs.).
M. Iwasa et al., U.S. Non-Final Office Action, U.S. Appl. No. 13/202,516, dated Mar. 29, 2016, (19 pgs.).
USPTO Office Action, U.S. Appl. No. 13/202,516, dated Oct. 6, 2016, 16 pages.

(56) References Cited

OTHER PUBLICATIONS

USPTO Office Action, U.S. Appl. No. 13/202,516, dated Aug. 10, 2017, 14 pages.
USPTO Office Action, U.S. Appl. No. 13/202,516, dated Feb. 23, 2018, 15 pages.
USPTO Office Action, U.S. Appl. No. 13/202,516, dated Aug. 3, 2018, 15 pages.
USPTO Office Action, U.S. Appl. No. 13/202,516, dated Jan. 24, 2019, 18 pages.
USPTO Office Action, U.S. Appl. No. 13/202,516 including US 2003/0054239, US 2007/0292752, US 2009/0145676, dated Dec. 11, 2019.
Notice of Allowance issued in U.S. Appl. No. 13/202,516 dated Jun. 10, 2020.

* cited by examiner

VEHICLE BATTERY MOUNTING STRUCTURE

FIELD OF THE INVENTION

This invention relates to a layout of batteries mounted on a vehicle.

BACKGROUND OF THE INVENTION

Japanese Patent Serial No. 3199296, issued by The Japan Patent Office in 2001, teaches placing a number of the batteries side by side under a floor panel of a vehicle so as to mount as many batteries as possible on the vehicle.

The batteries are arranged on a plain surface in a vehicle transverse direction and a vehicle longitudinal direction closely to form a battery group. A front seat and a rear seat are provided in a passenger compartment of the vehicle and the battery group is located under a floor panel of the passenger compartment including regions for the front seat and the rear seat.

SUMMARY OF THE INVENTION

In the prior art battery mounting structure described above, the batteries are arranged on a plain surface and have a uniform height. In other words, if an increase in the battery mounting capacity of the vehicle is required, the floor panel must be raised, and as a result, the comfort of the passenger compartment is impaired. Specifically, when the floor panel between the front seat and the rear seat is raised, the foot position of passengers sitting in the rear seat is raised and the passengers may feel discomfort.

According to the prior art battery mounting structure, it is often difficult to satisfy a requirement relating to the comfort of the passenger compartment of a vehicle together with a requirement relating to the battery mounting capacity of the vehicle.

It is therefore an object of this invention to provide a battery mounting structure that can satisfy both of the above requirements.

To achieve the above object, this invention provides a vehicle battery mounting structure for mounting a plurality of batteries under a floor panel of a vehicle, comprising a first group of the batteries, a second group of the batteries disposed to the rear of the first group of the batteries with respect to a vehicle longitudinal direction, and a third group of the batteries disposed to the rear of the second group of the batteries with respect to the vehicle longitudinal direction. Herein, a height of the second group of the batteries is set to be lower than a height of the first group of the batteries and a height of the third group of the batteries, and the height of the third group of the batteries is set to be higher than the height of the first group of the batteries.

This invention also provides a battery case fixed in a vehicle for accommodating a stack of batteries, comprising a first battery housing part, a second battery housing part disposed to the rear of the first battery housing part with respect to a vehicle longitudinal direction, and a third battery housing part disposed to the rear of the second battery housing part with respect to the vehicle longitudinal direction. Herein, a height of the second battery housing part is set to be lower than a height of the first battery housing part and a height of the third battery housing part, and the height of the third group of the batteries is set to be higher than the height of the first group of the batteries.

This invention also provides a battery mounting space formed in a floor panel of a vehicle to face downward, comprising a first recess, a second recess formed to the rear of the first recess with respect to a vehicle longitudinal direction, and a third recess formed to the rear of the second recess with respect to the vehicle longitudinal direction. Herein, a height of a bottom of the second recess is set to be lower than a height of a bottom of the first recess and a height of a bottom of the third recess, and the height of the third group of the batteries is set to be higher than the height of the first group of the batteries.

This invention also provides a battery assembly fixed in a vehicle, comprising a first group of batteries, a second group of the batteries disposed to the rear of the first group of the batteries with respect to a vehicle longitudinal direction, and a third group of the batteries disposed to the rear of the second group of the batteries with respect to the vehicle longitudinal direction. Herein, a height of the second group of the batteries is set to be lower than a height of the first group of the batteries and a height of the third group of the batteries, and the height of the third group of the batteries is set to be higher than the height of the first group of the batteries.

The details as well as other features and advantages of this invention are set forth in the remainder of the specification and are shown in the accompanying drawings.

DESCRIPTION OF THE PREFERRED EMBODIMENTS

Figure 1:
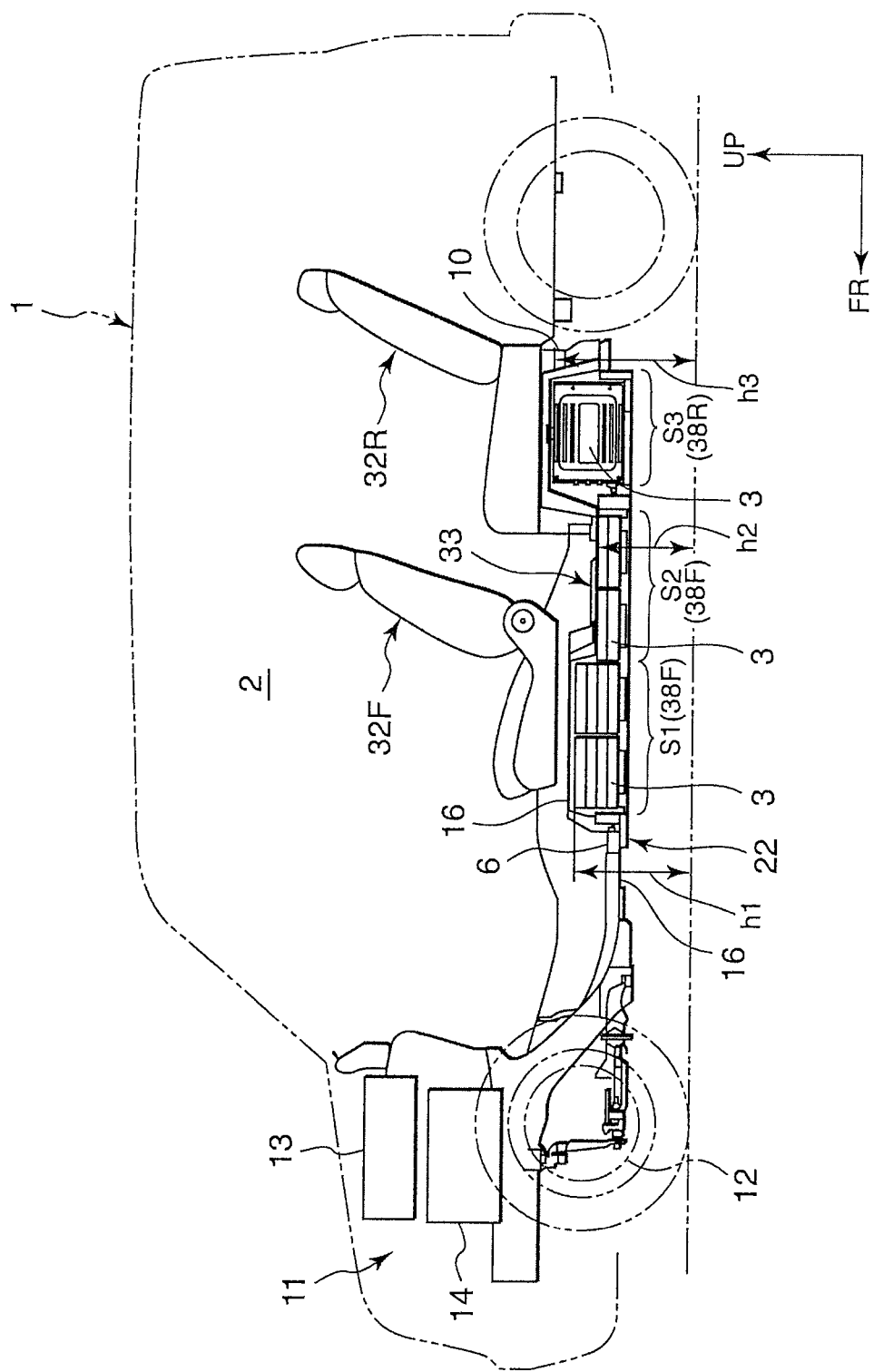
FIG. 1 is a longitudinal sectional view of essential parts of a vehicle showing a vehicle battery mounting structure according to this invention.

Referring to FIG. 1 of the drawings, a vehicle 1 comprises a passenger compartment 2 and a front compartment 11 provided in front of the passenger compartment 2. An arrow UP in the figure points vertically upward and an arrow FR in the figure points frontward with respect to running directions of the vehicle 1. The vehicle 1 is a so-called electric vehicle which runs under a motive force of an electric motor 12 housed in the front compartment 11. The vehicle 1 may be a hybrid-drive vehicle which runs under a motive force generated by an electric motor and a motive force generated by an internal combustion engine or a fuel cell vehicle which runs under a motive force generated by an electric motor that is driven by electric power generated by fuel cells.

To drive the electric motor 12, a number of batteries 3 are arranged in an under floor space of the passenger compartment 2 of the vehicle 1.

Figure 2:
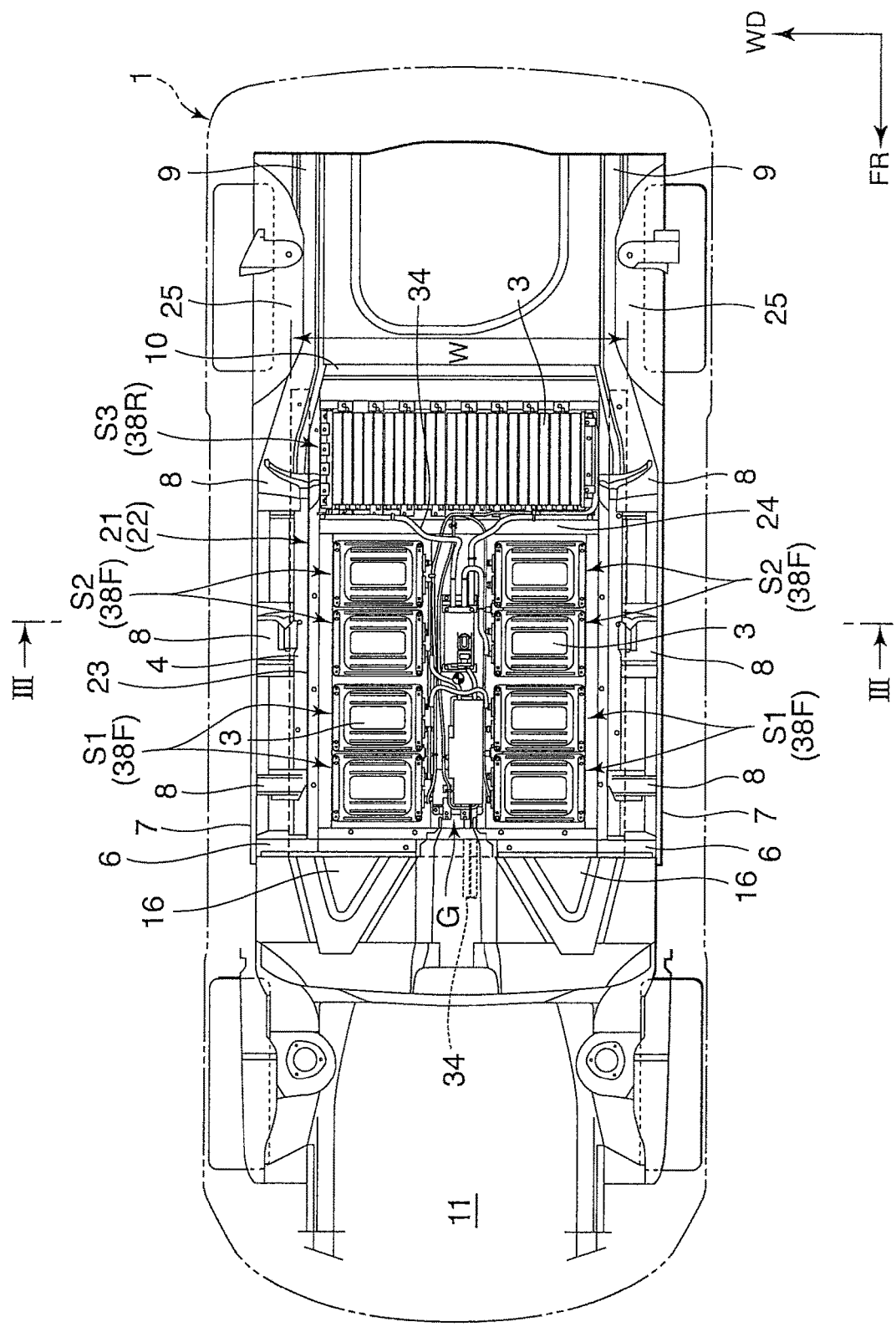
FIG. 2 is a horizontal sectional view of essential parts of the vehicle showing the vehicle battery mounting structure.
Figure 3:
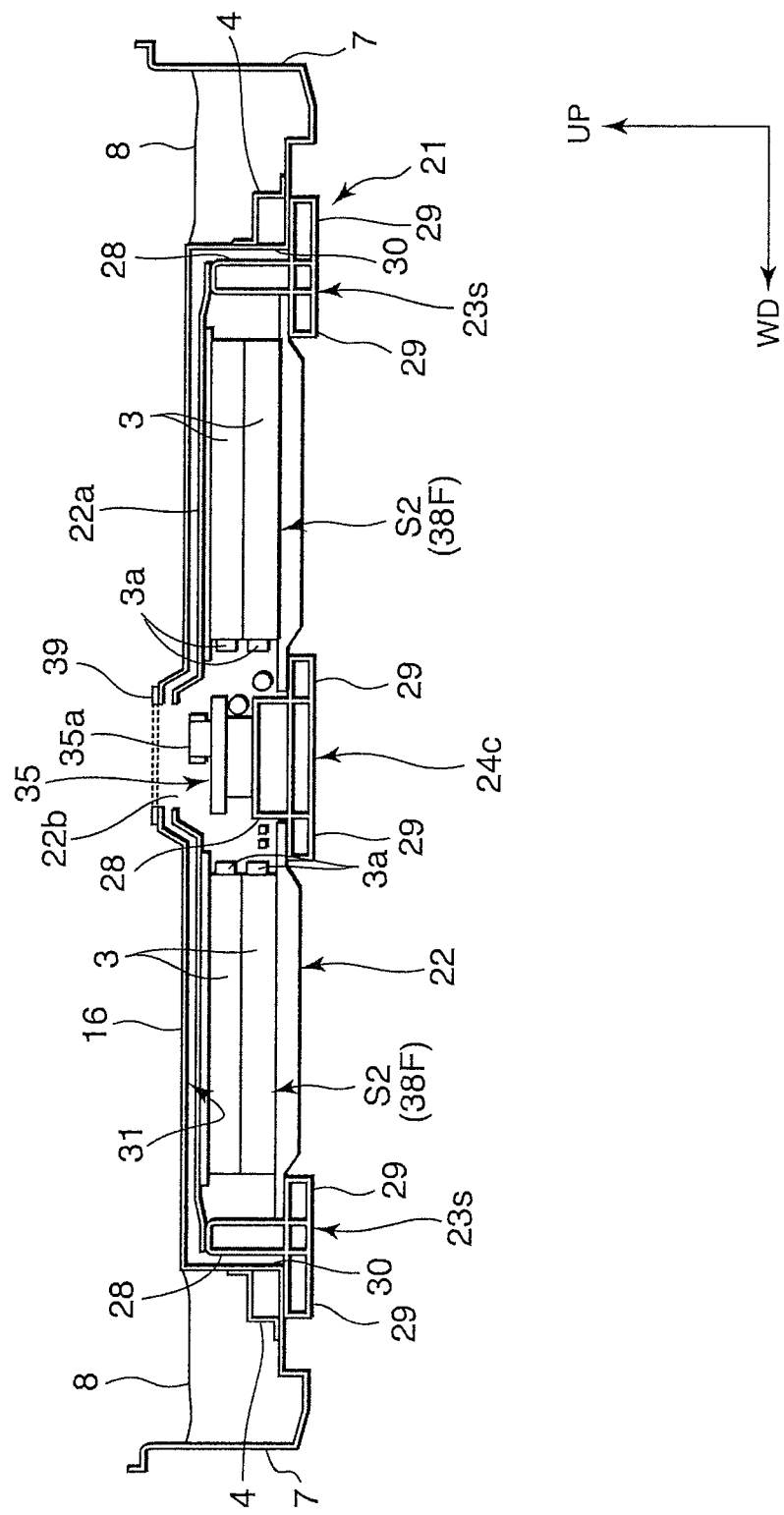
FIG. 3 is a cross-sectional view of essential parts of the vehicle taken along a line III-III of FIG. 2.

Referring to FIGS. 2 and 3, a pair of parallel side members 4 extending in a vehicle longitudinal direction are provided under a floor panel 16 forming a floor of the passenger compartment 2 of the vehicle 1. An arrow WD in the figures points rightward in a vehicle transverse direction when facing frontward with respect to the running directions of the vehicle 1. Front ends of the pair of side members 4 are fixed to a cross member 6 extending in the vehicle transverse direction of the vehicle 1. A pair of rear side members 9 are fixed to rear ends of the pair of side members 4. Rear ends of the pair of rear side members 9 are fixed to a rear cross member 10 extending in the vehicle transverse direction of the vehicle 1.

Both ends of the cross member 6 and both ends of the rear cross member 10 are fixed to a side sill 7 which delimits a lower end of a door opening serving as a part of a vehicle body. The pair of side members 4 are located on the inner side of the side sill 7 and each of the side members 4 is fixed to the side sill 7 via three outriggers 8. In FIGS. 2 and 3, a part designated by a reference number 7 corresponds to an inner wall face of the side sill 7. The members 4, 6, 9, and 10 are disposed in advance under the floor panel 16 as a part of the vehicle body.

Referring again to FIG. 1, an electric motor 12 serving as a motive force source for vehicle running, and a battery charger 13 and an inverter 14 serving as related devices are housed in the front compartment 11 of the vehicle 1. The battery charger 13 is a device for charging the batteries 3. The inverter 14 is a device for controlling charge/discharge of the batteries 3. In the following description, the electric motor 12 and the related devices will be referred to comprehensively as electric equipment.

Figure 4:
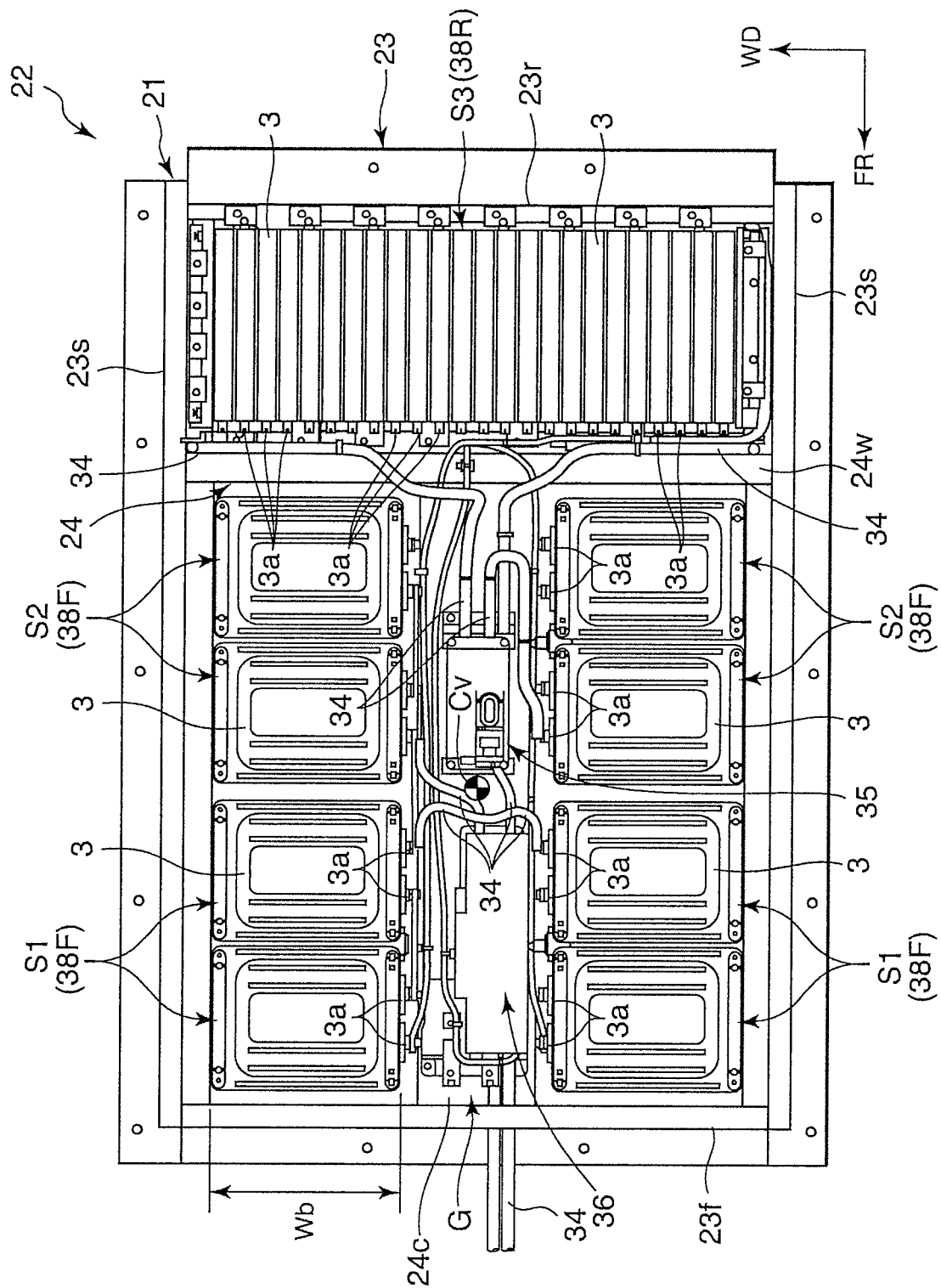
FIG. 4 is a plan view of a battery assembly according to this invention.
Figure 5:
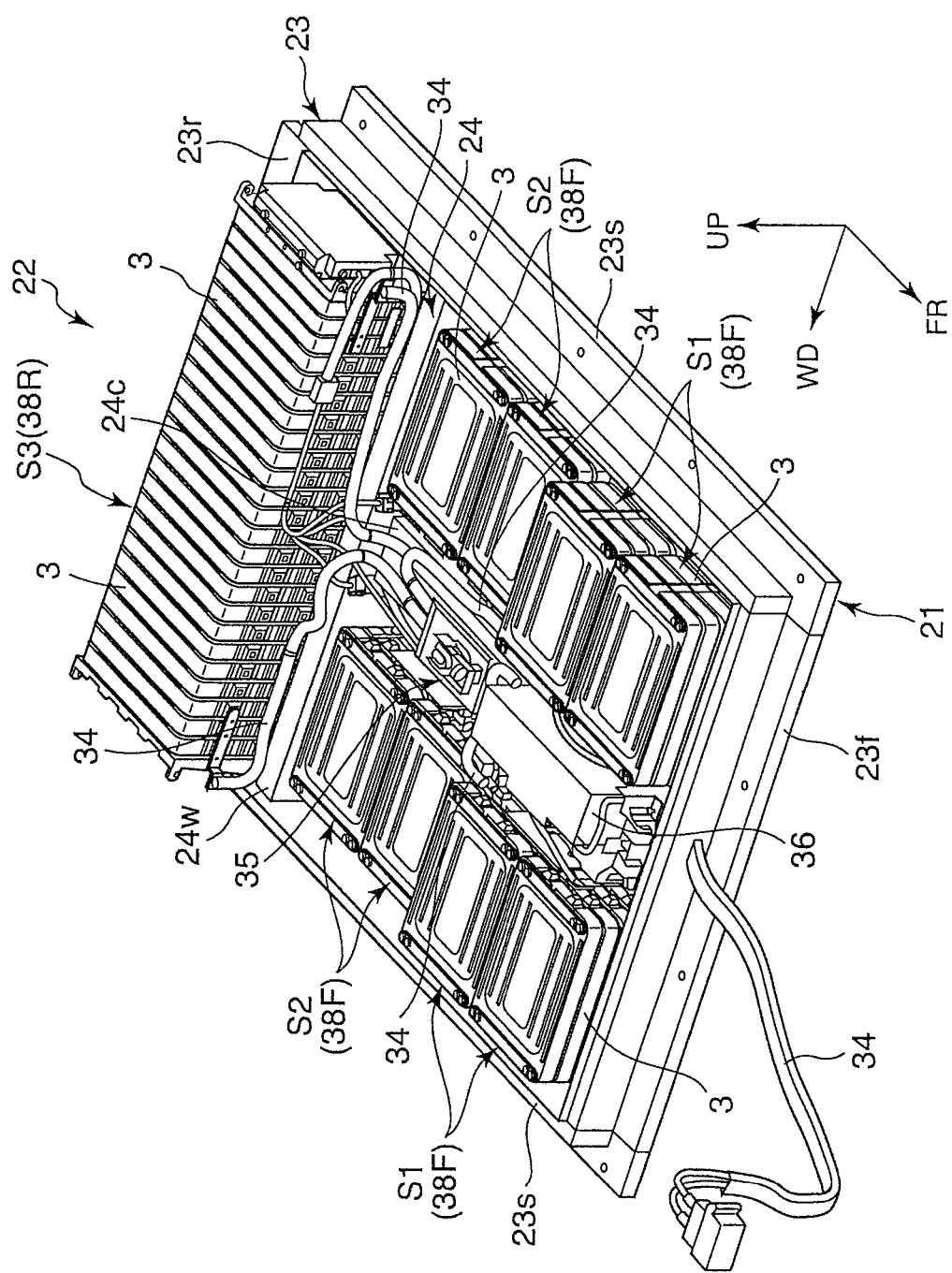
FIG. 5 is a perspective view of the battery assembly.

Referring to FIGS. 4 and 5, the batteries 3 are stacked in advance as a battery assembly 22 on the inner side of a battery mounting frame 21 having a rectangular planar shape. The battery assembly 22 is then fitted into a space surrounded by the pair of side members 4, the cross member 6, the pair of rear side members 9, and the rear cross member 10 from a lower side.

Figure 6:
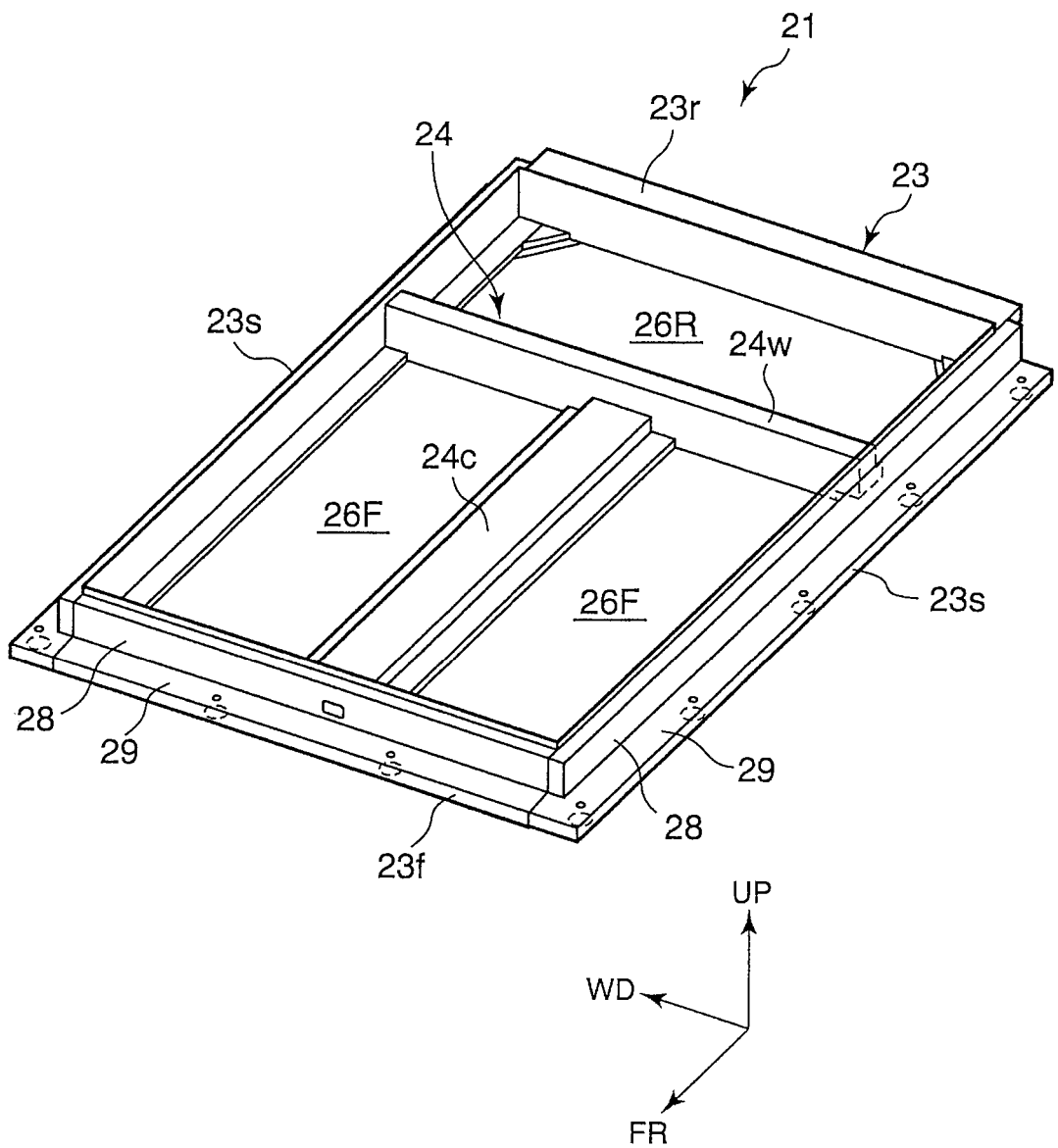
FIG. 6 is a perspective view of a battery mounting frame according to this invention.

Referring to FIG. 6, the battery mounting frame 21 comprises a rectangular frame 23 and a reinforcing member 24 which is arranged in the rectangular frame 23.

The rectangular frame 23 comprises a front edge member 23f, a rear edge member 23r, and a pair of side edge members 23s which connect both ends of the front edge member 23f and both ends of the rear edge member 23r. The front edge member 23f, the rear edge member 23r, and the pair of side edge members 23s form four sides of a rectangle. It should be noted that the terms front-aft or front end/rear end used in the description of the battery assembly 22 mean front-aft and front end/rear end in a state where the battery assembly 22 is fixed to the vehicle body.

Each of the front edge members 23f, the rear edge members 23r, and the pair of side edge members 23s is constituted by an upright wall portion 28 and a flange portion 29 extending horizontally from a lower end of the upright wall portion 28, thereby providing the members 23f, 23r and 23s with an inverted T-shaped cross-section.

The reinforcing member 24 comprises a girder 24w fixed in the rectangular frame 23 in the vehicle transverse direction, and a beam 24c connecting a middle part of the girder 24w and a middle part of the front edge member 23f. The reinforcing member 24 is integrated into the battery mounting frame 21 in advance by welding the girder 24w and the beam 24c into a T-shape, and welding each end of the resultant T-shape member to the rectangular frame 23.

According to the above structure, the inner space of the battery mounting frame 21 is divided into a front rectangular region in front of the girder 24w and a rear rectangular region 26R to the rear of the same. The front rectangular region is further divided into two front rectangular regions 26F, 26F by the beam 24c. A total area of the two front rectangular regions 26F, 26F is substantially the same as an area of the rear rectangular region 26R. The planar shape of these rectangular regions 26F, 26F, 26R is designed such that a long side of the rectangle is substantially double the size of a short side of the rectangle.

Figure 7:
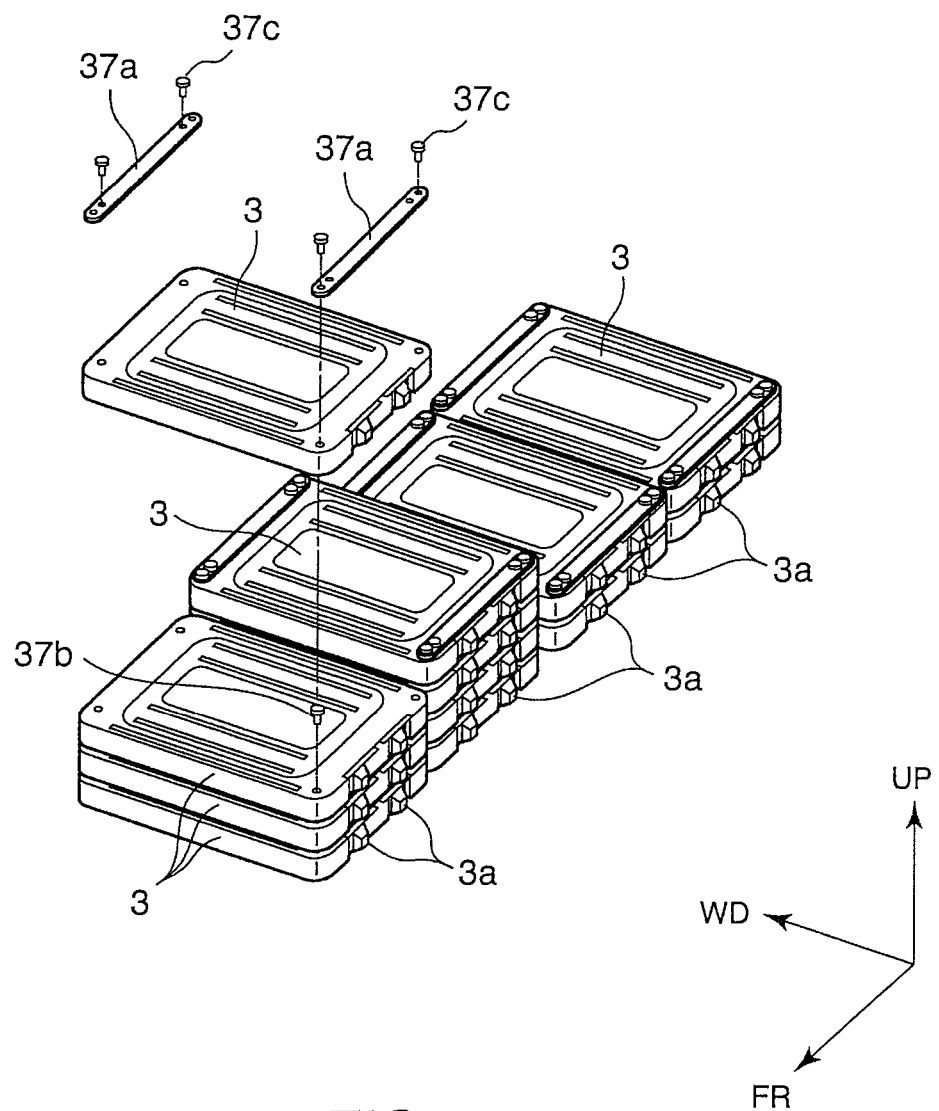
FIG. 7 is an exploded perspective view of a vertical battery stack according to this invention during a battery stacking process.

Referring to FIG. 7, each battery 3 is formed into a flat cuboid. The batteries 3 are stacked in a direction of a shortest side of the three sides of the cuboid. In the following description, the other two sides are referred to as a long side and a short side depending on a length of the sides.

In the two front rectangular regions 26F, 26F, the batteries 3 are stacked in the vertical direction in a state where the long side of the batteries 3 is oriented in the vehicle transverse direction and the short side of the batteries 3 is oriented in the vehicle longitudinal direction. In each of the front rectangular regions 26F, four stacks of the batteries 3 are arranged in the vehicle longitudinal direction. The numbers of stacked batteries 3 are not constant. In the frontmost two stacks in the region 26F, four batteries 3 are stacked in each stack while in the rearmost two stacks in the region 26F, two batteries 3 are stacked in each stack. Thus twelve batteries are stacked in each of the rectangular regions 26F, 26F.

In each stack in the front rectangular regions 26F, 26F, the batteries 3 are stacked via spacers 37b and strip-form plates 37a. The spacer 37b is a member comprising a columnar member and a large diameter part formed in the middle of the columnar member via a step on either side. Throughholes are formed through four corners of the batteries 3 in advance so as to accommodate the columnar part of the spacer 37b. Through-holes are also formed in the strip-form plates 37a.

When the batteries 3 are stacked, one of the columnar parts of a spacer 37b is inserted into a through-hole of the battery 3 after passing through a through-hole of a strip-form plate 37a, and the other columnar part of the spacer 37b is inserted into a through-hole of an adjacent battery 3 after passing through a through-hole of a different strip-form plate 37a. In this way, the large diameter part of the spacer 37b is gripped between the two batteries 3 via the strip-form plates 37a such that a stacking clearance of the batteries 3 is kept constant. The strip-form plate 37a and a spacer 37c comprising a columnar member and a large diameter part formed at an end of the columnar part via a step is attached to an uppermost battery 3 and a lowermost battery 3.

Although not shown in the figures, a through-hole is formed axially in each of the spacers 37b and 37c in advance. After stacking a predetermined number of the batteries 3, a pin is caused to penetrate the through-holes of the spacers 37b and 37c and a nut is screwed on each end of the pin. The batteries 3 are thus integrated into a battery stack.

Referring to FIG. 4, a space G is provided between the stacks in one of the front rectangular regions 26F, 26F and the stacks in the other of the front rectangular regions 26_F, 26F. The space G is located above the beam 24c and a region adjacent to the beam 24. The batteries 3 are stacked in the front rectangular regions 26F, 26F such that a terminal 3a of each battery 3 projects into the space G. The terminals 3a of the batteries 3, a harness 34 which electrically connects the terminals 3a and the electric equipment in the front compartment 11, and a switch box 35 and a junction box 36 interposed in the harness 34 are accommodated in the space G.

Figure 8:
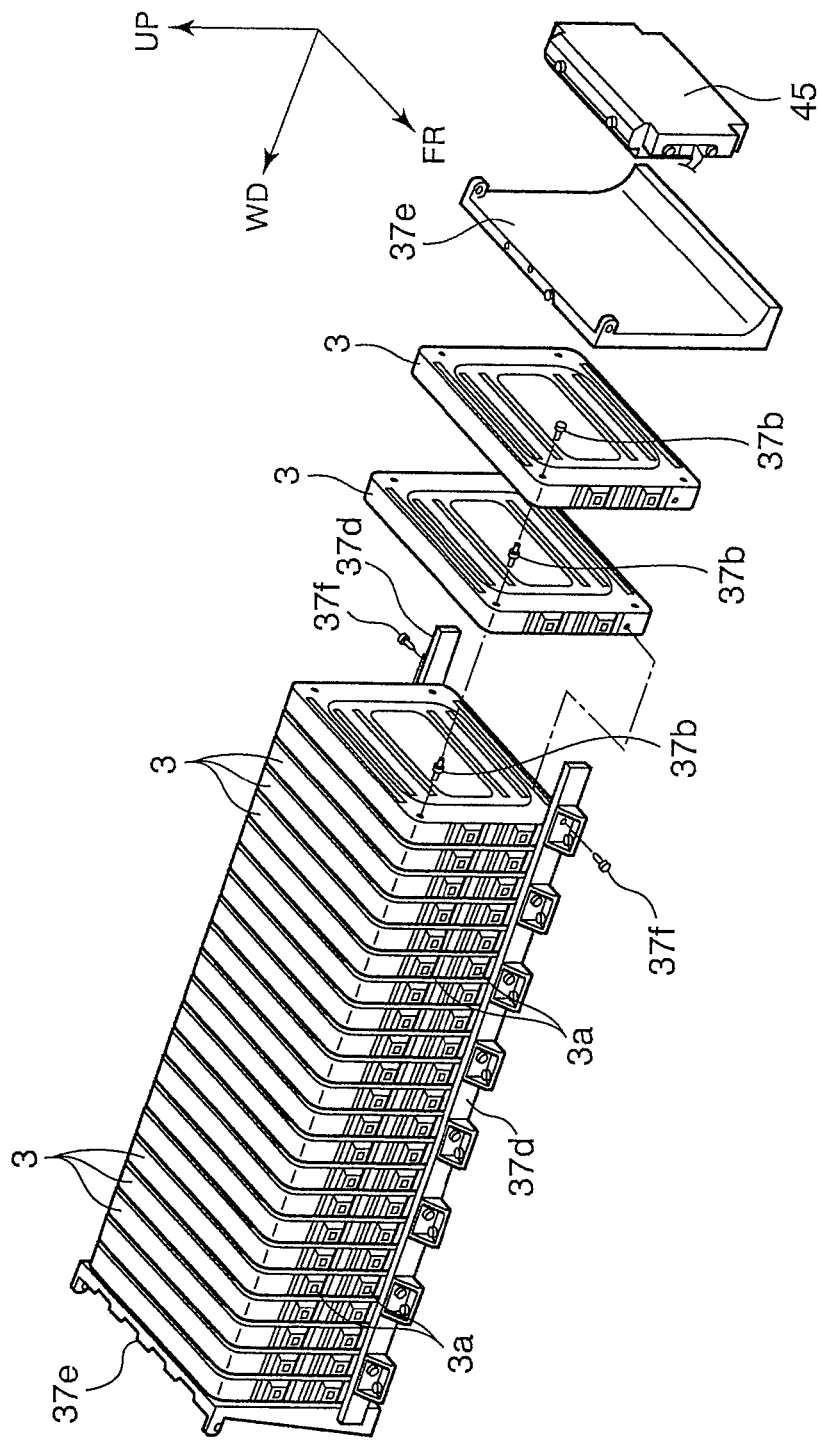
FIG. 8 is an exploded perspective view of a transverse battery stack according to this invention during a battery stacking process.

Referring to FIG. 8, twenty-four batteries 3 are stacked in the transverse direction of the vehicle in the rear rectangular region 26R in a state where the long side of the battery 3 is oriented in the vehicle longitudinal direction. The batteries 3 are stacked with constant clearances via the spacers 37b such that the terminals 3a project frontward. An end plate 37e is stacked on either end of the stack.

Although not shown in the figures, a through-hole is formed axially in each of the spacers 37b in advance. After stacking a predetermined number of the batteries 3, a pin is caused to penetrate the through-holes of the spacers 37b and a nut is screwed on each end of the pin. The batteries 3 are thus integrated into a battery stack.

A supporting plate 37d extending in the vehicle transverse direction is fixed to a front side face and a rear side face of the stack by screws 37f. Only one stack thus constructed is provided in the rear rectangular region 26R.

Referring to FIG. 5, according to the above layout of the batteries 3, a group S1 of the batteries 3 comprising two stacks of four batteries 3 stacked in the vertical direction and a group S2 of the batteries 3 comprising two stacks of two batteries 3 stacked in the vertical direction are provided in each of the two front rectangular regions 26F, 26F in the battery mounting frame 21. A group S3 of the batteries 3 comprising twenty-four batteries 3 stacked in the vehicle transverse direction is provided in the rear rectangular region 26R in the battery mounting frame 21. With respect to the stacking direction, the groups S1 and S2 constitute a first battery unit 38F being a set of vertically stacked batteries 3 while the group S3 constitute a second battery unit 38R being a set of transversely stacked batteries 3.

Figure 9:
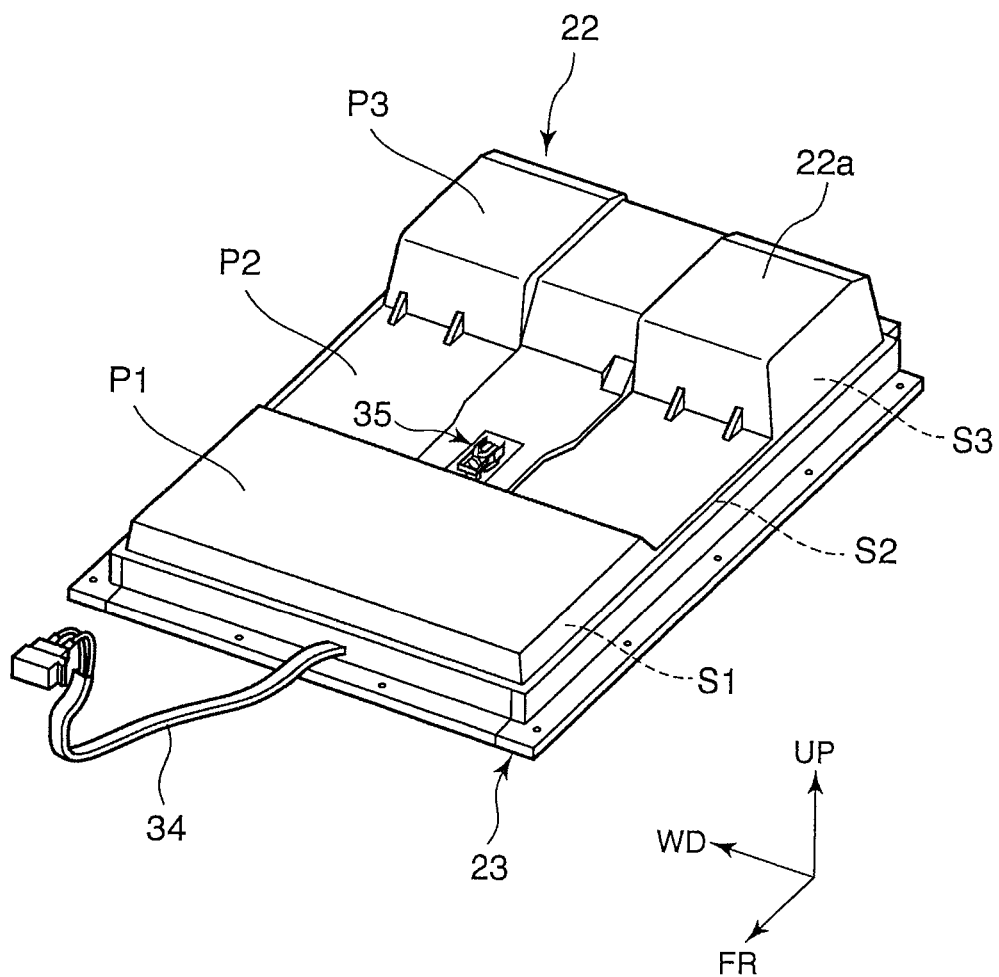
FIG. 9 is a perspective view of a case which accommodates the battery assembly.

Referring to FIGS. 3 and 9, a case 22a is fixed to the battery mounting frame 21 so as to accommodate the battery assembly 22.

The stacks of the batteries 3 are fixed to the case 22a by screws, for example. It is also possible to use the flange portion 29 extending inward from the upright wall portion 28 to fix the stacks. The case 22a is formed into a shape adapted to the battery assembly 22 in advance so as to prevent the stacks from displacing in the transverse, longitudinal, and vertical directions. It is preferable to form an opening or openings in a bottom of the case 22a to increase a cooling capability of the batteries 3. The shape and the number of the openings may be determined arbitrarily.

Referring to FIG. 8, it is preferable to accommodate a control unit 45 constituted, for example, by a microcomputer to control the devices in the junction box 36 in the case 22a on one side of one of the end plates 37e.

Herein, the battery mounting frame 21, the case 22a, the stacks of the batteries 3, the harness 34, the switch box 35, the junction box 36, and the control unit 45 constitute the battery assembly 22.

Referring to FIGS. 1-4, the battery mounting frame 21 is fixed to the cross member 6, the pair of side members 4, the pair of rear side members 9, and the rear cross member 10 using bolts penetrating the flange portion 29 that extends outward from the upright wall portion 28 and nuts screwed onto the bolts. In the fixed state, the upright wall portion 28 of the front edge member 23f faces the cross member 6, the upright wall portion 28 of the rear edge member 23r faces the rear cross member 10, and the upright wall portion 28 of the pair of side edge members 23s faces the side members 4 and a part of the pair of rear side members 9, respectively. Herein, the pair of side members 4, the cross member 6, the pair of rear side members 9, and the rear cross member 10 constitute a fixed member for fixing the battery mounting frame 21 onto the vehicle body.

The battery mounting frame 21 fixed to the fixed member assists in increasing the rigidity and strength of the vehicle body. The rectangular frame 23 and the reinforcing member 24 function as a transferring path for loads input during a vehicle collision.

A downward opening 30 shown in FIG. 3 is formed in the vehicle body by the pair of side members 4, the cross member 6, the pair of rear side members 9, and the rear cross member 10, which constitute the fixed member. The space above the opening 30 is covered by the floor panel 16, thereby forming a housing recess 31 to accommodate the battery assembly 22.

Mounting the battery assembly 22 on the vehicle body is performed by inserting the battery assembly 22 into the housing recess 31 from below the vehicle body and fixing the battery mounting frame 21 to the fixed member using the bolts and nuts. By integrating a number of the batteries 3 into the battery assembly 22 in advance, mounting the batteries 3 on the vehicle 1 can be accomplished easily. The batteries 3 thus mounted on the vehicle 1 can also be removed easily for replacement.

As shown in FIG. 1, the vehicle 1 comprises a front seat 32F and a rear seat 32R in the passenger compartment 2. The shape and size of the battery assembly 22, the shape and the size of the batteries 3, and the location of the fixed member are predetermined such that the group S1 of the batteries 3 is located substantially below the front seat 32F, the group S2 of the batteries 3 is located below the floor 33 between the front seat 32F and the rear seat 32R, and the group S3 of the batteries 3 is located below the rear seat 32R in a state where the battery assembly 22 is fitted into the housing recess 31. Further, the shape of the floor panel 16 and the case 22a are predetermined on the basis of the shape of the battery assembly 22.

Assuming that the height of the group S1 of the batteries 3 is h1, the height of the group S2 of the batteries 3 is h2, and the height of the group S3 of the batteries 3 is h3, the relation h3>h1>h2 holds. The heights h1 and h2 are common to the right rectangular region 26F and the left rectangular region 26F.

The group S1 of the batteries 3 is located under the front seat 32F, and the group S3 of the batteries 3 is located under the rear seat 32R. By setting the height h1 of the group S1 of the batteries 3 and the height h3 of the group S3 of the batteries 3 to be greater than the height h2 of the group S2 of the batteries 3, a space under the seats 32F and 32R in the passenger compartment 2 can be utilized efficiently for mounting the batteries 3, and a large number of the batteries 3 can be mounted on the vehicle 1 without affecting the comfort of the passenger compartment 2. Since the height h3 of the group S3 of the batteries 3 is higher than the height h1 of the group S1 of the batteries 3, the sitting level of the rear seat 32R becomes higher than the sitting level of the front seat 32F in the passenger compartment 2. This setting is preferable in terms of providing a wide view for passengers in the rear seat 32R.

The groups S1 of the batteries 3 on the right and left of the beam 24 are constituted by sixteen batteries in total. The groups S2 of the batteries 3 on the right and left of the beam 24c are constituted by eight batteries in total. The group S3 of the batteries 3 is constituted by twenty-four batteries. That is to say twenty-four batteries are mounted in front of the girder 24w and in the rear of the girder 24w, respectively. As a result, the weight of the group S3 of the batteries 3 is heavier than the total weight of the groups S2 of the batteries 3 and heavier than the total weight of the groups S1 of the batteries 3, and substantially equal to the total weight of the groups S2 of the batteries 3 and the groups S1 of the batteries 3.

According to the above arrangement of the batteries 3, the center of gravity of the battery assembly 22 is located to the rear of the center of a plan view of the battery assembly 22. Assuming that Cv in FIG. 4 is the graphical center of the vehicle 1, the center of gravity of the battery assembly 22 is located to the rear of the graphical center Cv of the vehicle 1. Considering that the electric equipment comprising the electric motor 12, the battery charger 13, and the inverter 14 is accommodated in the front compartment 11 of the vehicle 1, locating the center of gravity of the battery assembly 22 to the rear of the graphical center Cv of the vehicle 1 is preferable in terms of the weight balance of the vehicle 1 in the front-aft direction.

In the groups S1 and S2 of the batteries 3, the batteries 3 are stacked such that the long side is oriented in the vehicle transverse direction and the short side is oriented in the vehicle longitudinal direction. In this case, the density of the batteries 3 or the clearance between the batteries 3 in the vehicle transverse direction is determined according to the width W of the lower part of the vehicle body shown in FIG. 2 and the length Wb of the long side of the batteries 3 shown in FIG. 4. With respect to the groups S1 and S2 of the batteries 3, a space G formed between a row of the battery stacks in one of the rectangular regions 26F and a row of the battery stacks in the other rectangular region 26F contributes to this adjustment of the clearance. In the groups S1 and S2 of the batteries 3, the batteries 3 are stacked in the vertical direction. The respective heights h1 and h2 of the groups S1 and S2 of the batteries 3 can therefore be adjusted minutely by an adjustment unit equal to the length of the shortest side of the battery 3.

With respect to the group S3 of the batteries 3, the batteries 3 are stacked such that the shortest side is oriented in the vehicle transverse direction. Accordingly, by adjusting the stacking number of the batteries 3 and the clearance between the batteries 3 depending on the width W of the lower part of the vehicle body, the length of the group S3 of the batteries 3 in the vehicle transverse direction can be adjusted minutely and a large number of the batteries 3 can be mounted using the space under the rear seat 32R efficiently.

According to the type of the vehicle 1, a rear space in the passenger compartment 2 may be limited due to a rear wheel house 25 shown in FIG. 2 or a rear suspension. Since the dimension in the vehicle transverse direction of the group S3 of the batteries 3, which is located in the rear space in the passenger compartment 2, can be adjusted minutely as described above, a difference in the size of the rear space in the passenger compartment 2 can be absorbed easily.

As shown in FIG. 1, the groups S1 and S2 of the batteries 3 respectively have two battery stacks arranged in the vehicle longitudinal direction. However, this number of battery stacks can be altered depending on the dimension of the vehicle 1 in the longitudinal direction. For example, the group S1 of the batteries 3 may be constituted by three battery stacks arranged in the vehicle longitudinal direction while the group S2 of the batteries 3 is constituted by only one battery stack.

Thus, even when the layout of the seats of the vehicle 1 is changed, an optimum layout of the batteries can be realized by simply altering the number of the battery stacks in the groups S1-S3 without modifying the dimensions of the battery mounting frame 21. As a result, the battery mounting frame 21 can be applied to various types of vehicles.

According to the battery mounting structure described above, the rear edge member 23r and the girder 24w of the battery mounting frame 21 are located relatively near to the rear suspension. These members bring about an effect of increasing the rigidity of the vehicle body against a direct load input into the vehicle body when a rear side of the vehicle 1 undergoes a collision or an upward impact load transmitted from the rear suspension to the vehicle body. In the group S3 of the batteries 3, by stacking the batteries 3 in close contact with one another and increasing the strength of stack supporting members such as the supporting plates 37d, it is possible to cause the battery stack to contribute to an increase in the rigidity and strength of the vehicle body.

Since the harness 34, the switch box 35, and the junction box 36 are accommodated in the space G and the groups S1 and S2 of the batteries 3 are stacked such that the terminals 3a project into the space G. The space G, which is not used for stacking the batteries 3, is utilized effectively in the layout of these members. Putting the first battery unit 38F constituted by the vertically stacked batteries in front of the second battery unit 38R constituted by the transversely stacked batteries is also preferable in terms of obtaining the space for the layout of these members.

In the group S3 of the batteries 3, the batteries 3 are stacked such that the terminals 3a project frontward, or in other words into the upper space of the girder 24w. This layout of the batteries 3 is preferable in terms of protecting the terminals 3 in case of collision of the vehicle 1. Further, according to this layout of the batteries 3, connecting the harness 34 to the terminals 3a can be performed easily by using the upper space of the girder 24w. Still further, the durability of the harness 34 can be increased using the girder 24w to support the harness 34.

Figure 10:
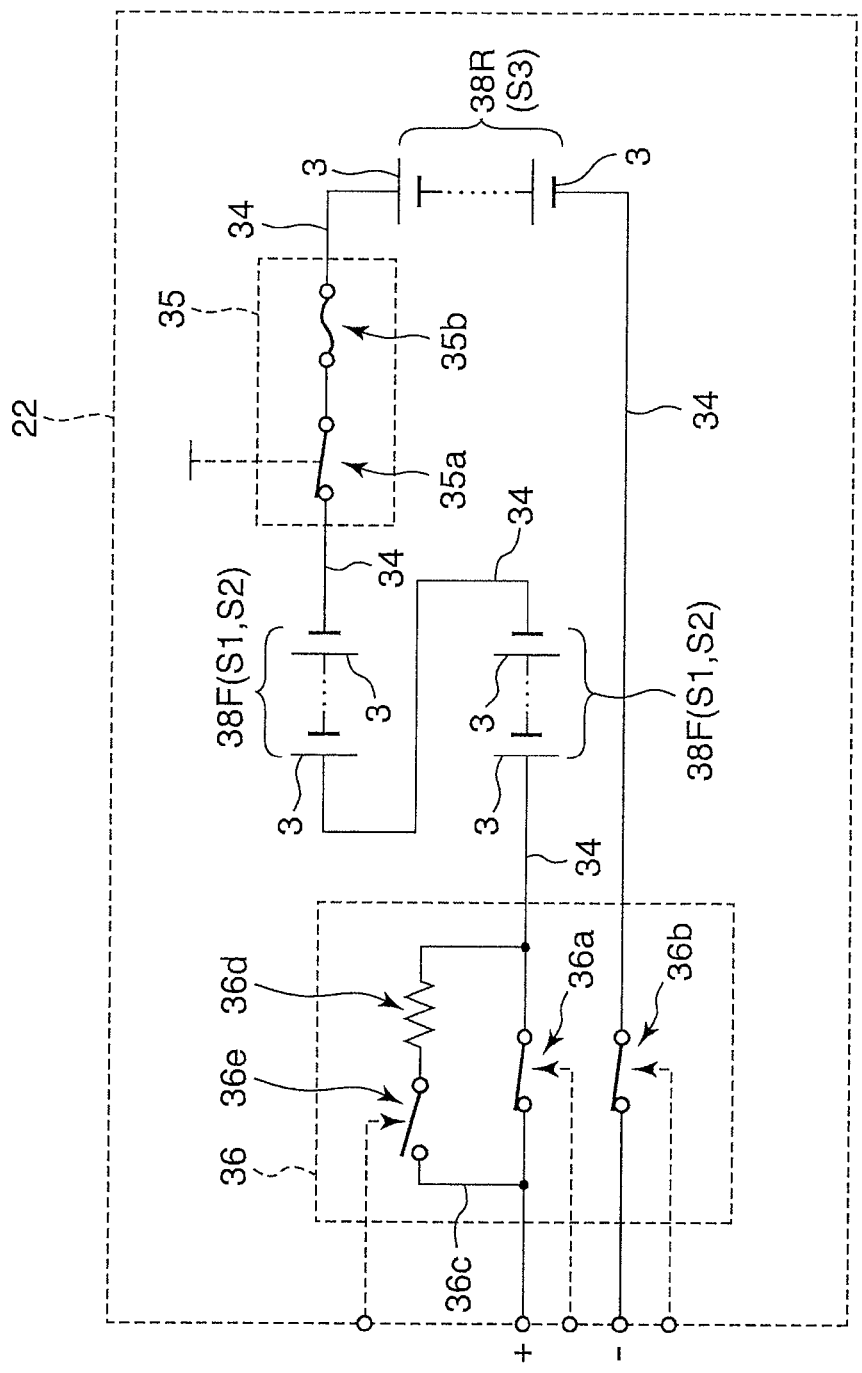
FIG. 10 is an electric circuit diagram of the battery assembly.

Referring to FIG. 10, an electric circuit of the battery assembly 22 will be described.

The electric circuit of the battery assembly 22 connects the batteries 3 in the group S3 and the batteries 3 in the groups S1 and S2 on the right and left rectangular regions 26F in series using the harness 34. The switch box 35 is interposed in the harness 34 between the batteries 3 in the group S3 and the batteries 3 in the groups S1 and S2. The junction box 36 is interposed between the terminals connected to both ends of the batteries 3.

The switch box 35 comprises a manually-operated relay 35a and a fuse 35b connected in series. The manually-operated relay 35a connects and disconnects the group S3 of the batteries 3 and the groups S1 and S2 of the batteries 3. In this embodiment, the electric circuit of the battery assembly 22 is divided into one circuit for the first battery unit 38F constituted by the groups S1 and S2 of the batteries 3 in the right and left rectangular regions 26F and another circuit for the secondary battery unit 38R constituted by the group S3 of the batteries 3. The terminal voltage of the first battery unit 38F and the terminal voltage of the second battery unit 38R are set to be equal in compliance with SAEJ2344. The number of batteries stacked in each of the first battery unit 38F and the second battery unit 38R is twenty-four.

The junction box 36 comprises a main conductor 36a which electrically connects a positive electrode of the first battery unit 38F and the inverter 14, and a sub-conductor 36b which electrically connects and disconnects a negative electrode of the second battery unit 38R and the inverter 14.

Further, in the junction box 36, a pre-charge circuit 36c comprising a resistor 36d and a pre-charge conductor 36e connected in series is provided in parallel with the main conductor 36a. Opening and closing operations of the main conductor 36a, the sub-conductor 36b, and the pre-charge conductor 36e are performed in response to opening/closing signals output from the aforesaid control unit 45. The junction box 36 may further comprise a voltage detecting device for detecting an output voltage of the battery units 38F, 38R and a current detecting device for detecting a power current output by the battery units 38F, 38R.

The switch box 35 is located farther from the inverter 14 than the junction box 36, or in other words in the rearmost part in the space G.

The switch box 35 is interposed between the first battery unit 38F and the second battery unit 38R as described above. In a physical sense also, the switch box 35 is preferably located near the midpoint between the first battery unit 38F and the second battery unit 38R so as to shorten the required length of the harness 34. In FIG. 10, the junction box 36 is disposed between the battery units 38F, 38R and the electric equipment. In a physical sense also, the junction box 36 is preferably disposed in front of the switch box 35 so as to shorten the required length of the harness 34.

In contrast, in a vehicle in which the electric equipment is disposed in the rear of the battery assembly 22, the junction box 36 is preferably disposed in the rear of the switch box 35.

Referring again to FIG. 3, an opening 22b is formed in the case 22a and a floor panel 16 covering the manually-operated relay 35a from above so as to operate the manually-operated relay 35a in the switch box 35 from within the passenger compartment 2. Further, a lid 39 is provided to cover the opening 22b. The lid 39 is designed to open and close such that the manually-operated relay 35a is exposed to the passenger compartment 2 and hidden therefrom. The switch box 35 is located between the right and left front seats 32F. By disposing the switch box 35 in this way, opening and closing the lid 39 and operating the manually-operated relay 35a can be conducted without displacing the front seat 32F. The switch box 35 may however be disposed in a different location.

Finally, the case 22a and the battery housing recess 31 will be described in detail.

Referring to FIG. 9, the case 22a comprises a first battery housing part P1 for accommodating the first group S1 of the batteries 3, a second housing part P2 for accommodating the second group S2 of the batteries 3, and a third housing part P3 for accommodating the third group S3 of the batteries 3. With respect to the vehicle longitudinal direction, the second housing part P2 is located to the rear of the first battery housing part P1 while the third housing part P3 is located to the rear of the second housing part P2.

Figure 11:
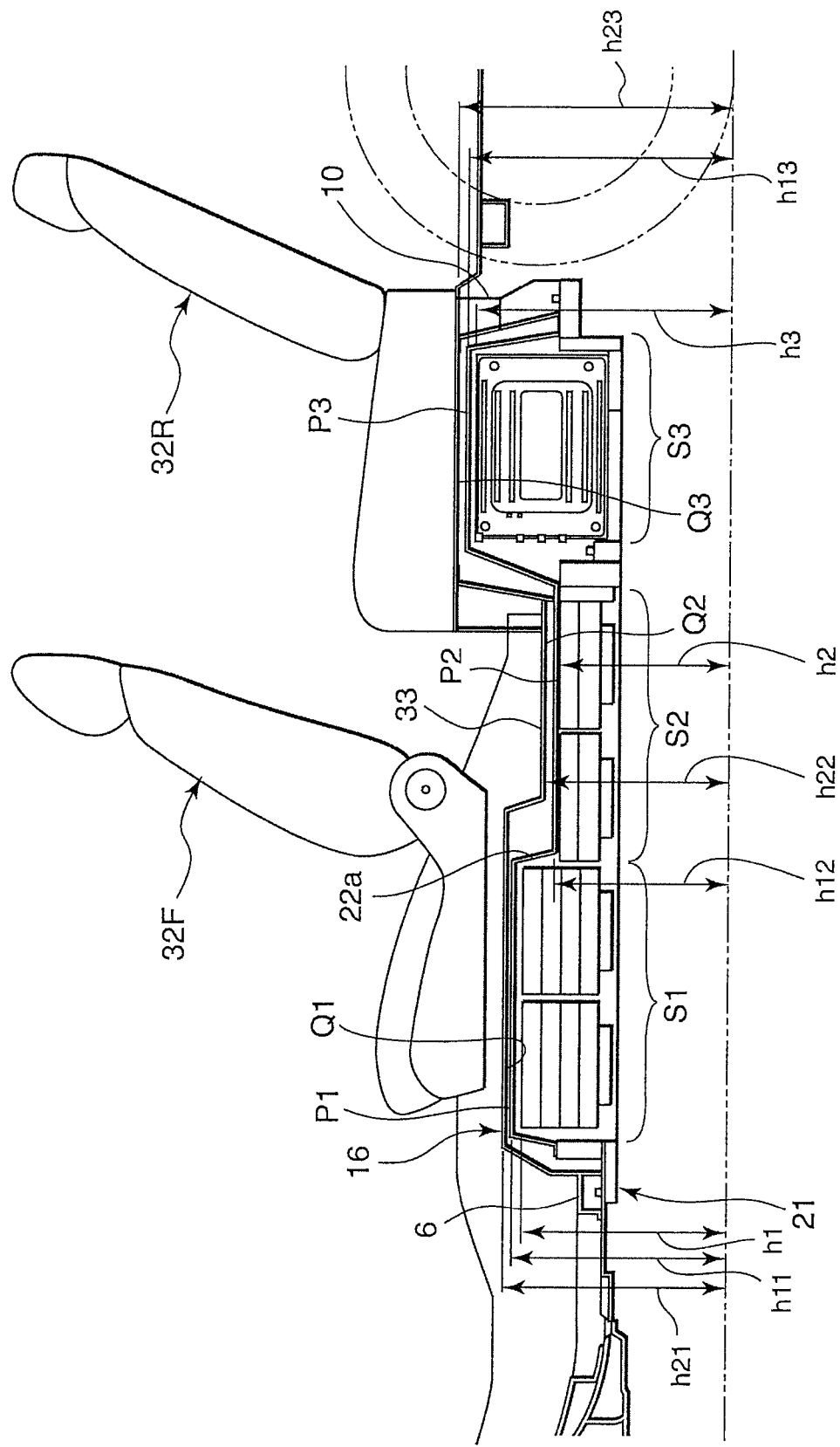
FIG. 11 shows an enlarged longitudinal sectional view of the case and a battery mounting recess according to this invention.

Referring to FIG. 11, assuming that a height of the first battery housing part P1 is h11, a height of the second housing part P2 is h12, and a height of the third housing part P3 is h13, the relation h13>h11>h12 holds.

The battery housing recess 31 is formed by the floor panel 16 and the battery mounting frame 21 and has a sufficient capacity to accommodate the groups S1-S3 of the batteries 3. The battery housing recess 31 comprises a first recess Q1 formed under the front seat 32F for accommodating the first group S1 of the batteries 3, a second recess Q2 formed under the floor 33 for accommodating the second group S2 of the batteries 3, and a third recess Q3 formed under the rear seat 32R for accommodating the third group S3 of the batteries 3.

Assuming that a height of a bottom of the first recess Q1 is h21, a height of a bottom of the second housing part Q2 is h22, and a height of a bottom of the third recess Q3 is h23, the relation h23>h21>h22 holds.

The contents of Tokugan 2009-41225, with a filing date of Feb. 24, 2009 in Japan, and the contents of Tokugan 2009-166942, with a filing date of Jul. 15, 2009 in Japan, are hereby incorporated by reference.

Although the invention has been described above with reference to certain embodiments, the invention is not limited to the embodiments described above. Modifications and variations of the embodiments described above will occur to those skilled in the art.

For example, the shape of the batteries 3 is not necessarily a flat cuboid. It is not vital that all of the batteries 3 have an identical shape and identical dimensions.

Although in this embodiment, the two groups S1 and S2 of the batteries 3 are provided as the first battery unit 38F, the first vertical unit 38F may be constituted by one group of the batteries 3. Also in this embodiment, the space G is formed above the beam 24c so that the groups S1 and S2 of the batteries 3 are located on the right and left of the space G. However, it is possible to eliminate the space G and arrange the battery stacks of the first battery unit 38F without a clearance in the vehicle transverse direction depending on the width W of the lower part of the vehicle body and the dimensions of the batteries 3.

The battery mounting frame 21 need not be made in a rectangular shape, and may be made in a different shape depending on the type of the vehicle 1. Instead of connecting the girder 24w and the beam 24c in a T-shape, they may be connected in a cruciform shape.

Further, the battery mounting frame 21 is not an essential component of this invention. When the batteries 3 are mounted on a vehicle without using the battery mounting frame 21, a preferable weight balance in a front-aft direction of the vehicle is realized by providing a first battery unit 38F comprising the vertically stacked batteries 3 and a second battery unit 38R comprising the transversely stacked batteries 3.

The electric circuit of the battery assembly 22 shown in FIG. 10 is also not an essential component of this invention. This invention can be applied to any vehicle on which a plurality of the batteries 3 are mounted irrespective of the electric circuit of the batteries 3.

INDUSTRIAL FIELD OF APPLICATION

As described above, the vehicle battery mounting structure according to this invention is preferably applied to an electric vehicle, but not limited thereto.

The embodiments of this invention in which an exclusive property or privilege is claimed are defined as follows:

The invention claimed is:

1. A vehicle mounting a plurality of batteries under a floor panel of the vehicle, comprising:
   a first group of the batteries;

a second group of the batteries disposed to the rear of the first group of the batteries with respect to a vehicle longitudinal direction; and a third group of the batteries disposed to the rear of the second group of the batteries with respect to the vehicle longitudinal direction;

wherein each of the first group of batteries, the second group of batteries and the third group of batteries has a topmost surface parallel to a road surface that the vehicle is on and not in contact with other batteries or other group of batteries, wherein, when measured from the road surface, a height to the topmost surface of the second group of the batteries is set to be lower than a height to the topmost surface of the first group of the batteries and a height to the topmost surface of the third group of the batteries, and the height to the topmost surface of the third group of the batteries is set to be higher than the height to the topmost surface of the first group of the batteries, and wherein the vehicle comprises a passenger compartment in which a front seat, a rear seat, and a floor located between the front seat and the rear seat are provided, the first group of the batteries is mounted under the front seat, the second group of the batteries is mounted under the floor, and the third group of the batteries is mounted under the rear seat.

2. The vehicle as defined in claim 1, wherein the second group of the batteries comprises a plurality of the batteries having a direction of stacking in a vertical direction and the third group of the batteries comprises a plurality of the batteries having a direction of stacking in a vehicle transverse direction.

3. The vehicle as defined in claim 2, wherein the first group of the batteries comprises a plurality of the batteries having a direction of stacking in a vertical direction.

4. The vehicle as defined in claim 1, further comprising a battery mounting frame in which the first group of the batteries, the second group of the batteries, and the third group of the batteries are fixed in advance as a battery assembly, and the first group of the batteries, the second group of the batteries, and the third group of the batteries are fixed in the vehicle via the battery mounting frame.

5. The vehicle as defined in claim 4, wherein the battery mounting frame comprises a rectangular frame having a rectangular planar shape and a reinforcing member fixed to an inside of the rectangular frame.

6. The vehicle as defined in claim 5, wherein the rectangular frame comprises a front edge member disposed at a front end thereof with respect to the vehicle longitudinal direction, and the reinforcing member comprises a girder fixed to the inside of the rectangular frame in a vehicle transverse direction and a beam connecting a girder and the front edge member, the girder and the beam forming a T-shape in a plan view.

7. The vehicle as defined in claim 5, wherein the vehicle comprises a fixed member for fixing the battery mounting frame.

8. The vehicle as defined in claim 6, wherein the first group of the batteries and the second group of the batteries are fixed to the rectangular frame in front of the girder with respect to the vehicle longitudinal direction and the third group of the batteries is fixed to the rectangular frame to the rear of the girder with respect to the vehicle longitudinal direction.

9. The vehicle as defined in claim 4, further comprising a case formed into a predetermined shape and fixed to the battery mounting frame so as to accommodate the first group of the batteries, the second group of the batteries, and the third group of the batteries.

10. The vehicle as defined in claim 1, wherein the first group of the batteries and the second group of the batteries comprise a space in a center part with respect to a vehicle transverse direction, and the batteries in the first group and the second group comprise terminals projecting into the space.

11. The vehicle as defined in claim 10, wherein the batteries of the third group comprise terminals projecting frontward with respect to a vehicle longitudinal direction.

12. The vehicle as defined in claim 10, wherein:
the vehicle comprises a front compartment located in front of the passenger compartment with respect to the vehicle longitudinal direction,
an electric equipment comprising an electric motor and a related device as a motive force source for traveling is accommodated in the front compartment, and
the vehicle further comprises a harness for connecting the terminals of the batteries of the first, second, and third groups, and the electric equipment.

13. The vehicle as defined in claim 12, wherein the first group of batteries includes a first stack of batteries and a second stack of batteries positioned adjacent to the first stack of batteries in a longitudinal direction of the first stack of batteries, the vehicle including a space between the first stack of batteries and the second stack of batteries, wherein the harness is disposed in the space.

* * * * *